United States Patent [19]

Allen et al.

[11] 4,415,691
[45] * Nov. 15, 1983

[54] ANTI-BLOCK ADDITIVES FOR OLEFIN POLYMERS

[75] Inventors: James A. Allen; George W. Knight, both of Lake Jackson; Morris S. Edmondson, Alvin, all of Tex.

[73] Assignee: The Dow Chemical Company, Midland, Mich.

[*] Notice: The portion of the term of this patent subsequent to Apr. 27, 1999 has been disclaimed.

[21] Appl. No.: 359,636

[22] Filed: Mar. 18, 1982

Related U.S. Application Data

[63] Continuation of Ser. No. 191,594, Sep. 29, 1980, Pat. No. 4,327,009.

[51] Int. Cl.$^3$ .............................................. C08K 5/15
[52] U.S. Cl. .................................. 524/114; 524/308; 524/310; 524/313; 524/317; 524/366; 524/376; 524/377; 524/388; 526/352; 528/494; 528/495

[58] Field of Search ............... 524/114, 308, 310, 313, 524/317, 366, 376, 377, 388; 526/352; 528/494, 495

[56] References Cited

U.S. PATENT DOCUMENTS

| | | | |
|---|---|---|---|
| 2,951,056 | 8/1960 | Pfeifer et al. | 524/114 |
| 4,010,127 | 3/1977 | Taka et al. | 524/114 |
| 4,215,169 | 7/1980 | Wysong | 524/114 |
| 4,327,009 | 4/1982 | Allen et al. | 524/114 |

Primary Examiner—Joseph L. Schofer
Assistant Examiner—N. Sarofin
Attorney, Agent, or Firm—W. J. Lee

[57] ABSTRACT

Extrusion-cast films of high molecular weight, linear, low density ethylene copolymers which inherently have high block and high cling characteristics are compounded with a minor amount of a low molecular weight organic, such as a polyglycol, before being extrusion-cast as a thin film, the low molecular weight organic serving to substantially reduce the block, but retaining high cling characteristics.

10 Claims, No Drawings

ANTI-BLOCK ADDITIVES FOR OLEFIN POLYMERS

CROSS REFERENCE TO RELATED APPLICATION

This is a continuation of Ser. No. 191,594 filed Sept. 29, 1980, now U.S. Pat. No. 4,327,009.

BACKGROUND OF THE INVENTION

There are various high molecular weight olefin polymers and copolymers which are suitable in making extrusion-cast films for commercial purposes. Such extrusion-cast films are generally made by extrusion of the molten polymer onto revolving chilled rolls; the general technique is often referred to as "chill roll extrusion" or "cast film extrusion."

There are, basically, two types of olefin polymerization techniques for preparing high molecular weight olefin polymers and copolymers. The oldest commercial technique involves high pressure, high temperature, and the use of a free radical initiator, such as a peroxide; these type polymers are generally known as low density polyethylene (LDPE) and are also known as ICI-type polyethylenes. These LDPE polymers contain branched chains of polymerized monomer units pendant from the main polymer "backbone" and generally have densities in the range of about 0.910–0.935 gms./cc.

The other commercially-used technique involves coordination catalysts of the "Ziegler" type or "Phillips" type and includes variations of the Ziegler type, such as the Natta type. These catalysts may be used at very high pressures, but may also (and generally are) used at very low or intermediate pressures. The products made by these coordination catalysts are generally known as "linear" polymers because of the substantial absence of branched chains of polymerized monomer units pendant from the main polymer "backbone," and they are also generally known as high density polyethylene (HDPE). It is these "linear" polymers to which the present invention pertains. Linear polyethylene (HDPE) ordinarily has a density in the range of 0.941 to 0.965 gms./cc.

In particular, the present invention pertains to "linear" type ethylene polymers wherein ethylene has been polymerized along with minor amounts of alpha, beta-ethylenically unsaturated alkenes having from 3 to 12 carbons per alkene molecule, preferably 4 to 8. The amount of the alkene comonomer is generally sufficient in the same density of the polymer to be substantially in the same density range as LDPE, due to the alkyl side-chains on the polymer molecule, yet the polymer remains in the "linear" classification; they are conveniently referred to as "linear low density polyethylene" (LLDPE). These polymers retain retain much of the strength, crystallinity, and toughness normally found in HDPE homopolymers of ethylene, but the higher alkene comonomers impart high "cling" and "block" characteristics to extrusion-cast films and the high "slip" characteristic inherently found in HDPE is diminished.

Slip and antiblock agents are often added to LDPE film compounds to insure proper film handling characteristics. "Slip," basically defined as the coefficient of sliding friction, may be adjusted by incorporating, e.g., fatty acid amides. Blocking, the tendency of film to stick to itself, can be reduced by adding finely divided inorganic fillers such as silica. HDPE homopolymers with densities of above about 0.940 gm./cc. generally show good slip properties (that is, they slide across each other with ease), and slip agents are not normally required.

U.S. Pat. No. 3,658,980 is a closely-related invention which discloses addition of various additives, such as polyglycols, to low density ethylene polymers and copolymers for the purpose of increasing the cohesion of films prepared from said polymers.

U.S. Pat. No. 2,879,244 pertains to the incorporation of anti-static agents during the polymerization of ethylenic monomers.

U.S. Pat. No. 3,070,462 pertains to the surface treatment of pre-formed films of low density ethylene polymers to impart adherent properties and cling to such polymers.

U.S. Pat. No. 3,108,011 pertains to rendering textile materials antistatic by the use of polyamines containing polyalkylene oxide groups and other compounds.

U.S. Pat. No. 3,121,914 pertains to a mixer-extruder method and apparatus for adding a fluid to a plastic material.

U.S. Pat. No. 3,387,073 pertains to the use of glycerol as a plasticizer to aid in the dynamic extrusion of high molecular weight (very low melt index) high density ethylene polymers (HDPE) made using a Phillips-type or Ziegler-type catalyst.

U.S. Pat. No. 3,499,950 teaches the use of polypropylene glycols as antistatic agents in olefin polymers and copolymers.

SUMMARY OF THE INVENTION

Extrusion-cast films of high molecular weight, linear, low density ethylene copolymers which inherently have high block and high cling characteristics are compounded with a minor amount of a low molecular weight organic, such as a polyglycol, before being extrusion-cast as a thin film, the low molecular weight organic serving to substantially reduce the block, but retaining high cling charactistics.

DETAILED DESCRIPTION OF THE INVENTION

The high molecular weight, linear, low density ethylene copolymers within the purview of the present invention are those made under conditions which are conducive to preparation of linear polymers such as by the well-known Ziegler or Phillips processes. The instant ethylene polymers contain minor amounts (about 5% to about 20% by weight) of at least one alpha-olefin comonomer selected from the group consisting of propylene, 1-butene, 1-isobutene, 1-pentene, 1-isopentene, 1-hexene, 1-isohexene, 1-heptene, 1-isoheptene, 1-octene, 1-isooctene, 1-nonene, 1-isononene, 1-decene, 1-isodecene, and the like. The amount of comonomers used is enough to result in polymer densities in the low range of about 0.900–0.930 gms./cc. The instant copolymers are also characterized as being high molecular weight, having a melt index (melt flow) in the range of about 0.2 to about 20 gms./10 min. as measured by ASTM-D-1238 condition (E), and as having, inherently, high block and high cling characteristics. Such polymers are ideally suited for use where high strength, high cling, extrusion-cast films are used as packaging materials, but the excessively high block is detrimental when the film is manufactured in the customary manner involving large rolls, especially when rolled at very warm conditions. During shipping and/or storage, the high block polymers tend to adhere layer-to-layer with such a strong adhesion force that unrolling the film often causes distortion, and even tearing, of the film. It appears that when enough of the higher alkene comonomers are used in the linear ethylene copolymer to result in a relatively low density polymer (i.e., about 0.90 to about 0.93 gms./cc), the pendant alkyl groups provide surface phenomena or surface properties which result in high block and high cling. The nature of this phenomenon is not fully understood. The phenomenon is observed even on cast films of the subject polymers when employed as a "core" layer between two very thin outer layers of ordinary LDPE.

The block and cling influence of linear LDPE through skins of ordinary high pressure LDPE is largely affected by the thickness of the skins. Skin thicknesses of greater than about 0.2 mil, especially greater than about 0.5 mil are generally great enough to substantially "mask" the influence of the linear central layer, and the cast co-extruded film primarily exhibits the block and slip characteristics of the skin.

As used herein, the term "cling" is used in referring to the tendency of two layers of the film to remain in contact with each other, but which are easily peeled apart without disturbing the properties of either surface. The "cling" property is quite noticeable when the compression forces of tightly wound rolls are encountered as the film is under tension during winding. In an end-use situation, the cling property of overlapped layers is enhanced by compression.

The term "block" is used here to describe the adhesion of two layers of the film to each other by the application of even slight compression and where pulling apart of the layers is likely to create even small changes in the film. Such "blocking" is also somewhat dependant on, or responsive to, the amount of compression applied as well as to the duration of the compression and to the temperature. "Destructive block" refers to tendencies to form substantially irreversible adhesion where peeling apart is likely to cause deformation or tearing of the film; such "destructive block" can occur even when compression forces are small, such as when rolls of the film are made during manufacture, especially when the rolls are prepared, stored, or shipped under very warm or hot conditions.

It is an object of the present invention to substantially reduce the blocking characteristics in the above-described polymers, thereby avoiding the destructive auto-adhesion of the films during shipping or storage, yet retain the desirable high cling which is desired in many packaging applications.

It is a further object to reduce the blocking of said polymers without substantially reducing the desirable qualities of high strength, high modulus, good gloss, and good clarity.

These and other objects are substantially attained by incorporating into the above-described polymers certain additives, as described below, prior to extrusion-casting the thin film product.

It is a requirement of this invention that the extruded plastic film product contain the specified amount of a liquid having the following characteristics: molecular weight up to about 5,000, vapor pressure below atmospheric pressure at temperatures just above the film melt extrusion temperature and thermal stability at such temperatures, and Saybolt viscosity of at least about 100 centistokes at 77° F. For the purposes of this invention a liquid is thermally stable at a given temperature if it does not decompose to the extent of forming components which have vapor pressures above atmospheric pressure at the given temperature. Usually a liquid having the required properties is chosen and incorporated into the polymerized olefin before or during film fabrication. However, a material, not necessarily a liquid, which does not per se have all of the required properties, but which is converted to a liquid having such properties during the fabrication process, can be suitably used in the plastic composition. For example, a polypropylene glycol having molecular weight of 15,000 which (during the film fabrication) decomposes to a polypropylene glycol having molecular weight of, say, 2,000, is a suitable material. The same reasoning would apply to a material having a very low molecular weight and low viscosity which material, upon heating to film melt extrusion temperature, would cross-link to form a liquid having the required molecular weight and viscosity. It is realized, of course, that molecular weight values of these low molecular weight polymeric additives are essentially weight average values.

The liquid in the extruded film product must have a molecular weight such that it can migrate effectively throughout the polymeric structure. Molecules of liquids having molecular weights less than about 5,000 are capable of passing substantially unhindered between the lattices of the polymeric structure, thus diffuse or migrate effectively to the surface of the film. In contrast thereto large molecules, being of a more bulky nature, have long "tails" which tend to "hook" or wrap around portions of the polymeric structure. As a result, large molecules diffuse slowly and consequently will not migrate in a reasonable amount of time, usually up to about 2 months. It is found that liquids having molecular weights up to about 5,000 are operable, with preferred liquids having molecular weights between about 300 and about 3,000.

In order for the cohesion-reducing liquid to be present in the polymer following the extrusion process, the liquid must have a vapor pressure below atmospheric pressure at temperatures just above the film melt extrusion temperature. To satisfy this requirement, the liquid generally must have a boiling point above about 285° C.

The liquid in the extruded film product must have sufficient cohesive energy to retain the requisite cling properties in the film. Liquids having viscosities below about 100 centistokes at about 77° F. (25° C.) do not ordinarily possess sufficient cohesion and therefore are generally not operable for the purposes of this invention.

In order to minimize optical problems such as haze, it is preferable that the liquid have a refractive index about the same as that of the polymerized olefin or otherwise have a surface tension such that the liquid will wet the entire surface of the polymerized olefin.

As indicated above, suitable liquids can possess virtually any chemical structure provided that they have the required physical properties as described. For the purposes of illustrating the invention, typical liquids have the aforementioned characteristics are given as follows: the polyalkylene ether diols, e.g., polyethylene glycol, polypropylene glycol, polybutylene glycol and the like; polyepichlorohydrin; trihydric and higher polyhydric alcohols, e.g., glycerol, sorbitol, mannitol, and the like; the liquid esters of the high molecular weight fatty acids, e.g., sorbitan monooleate, sorbitan monolaurate, sorbitan trioleate, sorbitan tristearate, sorbitan sesquioleate, sorbitan monostearate, sorbitan monopalmitate, polyoxyethylene sorbitan monostearate, polyoxyethylene monooleate, polyoxyethylene sorbitan monolaurate, polyoxyethylene monostearate, polyoxyethylene dioleate, polyoxyethylene monolaurate, and the like; the vegetable oils, e.g., peanut, olive, cottonseed, soybean, corn, coconut, and castor oils; and the polyethers, e.g., polyoxyethylene lauryl ether, polyoxyethylene oleyl ether, polyoxyethylene aryl alkyl ether, polyoxyethylene cetyl ether and the like. Preferred liquids are the polymers of dihydric alcohols with an especially preferred liquid being polypropylene glycol having a molecular weight of about 2,000.

Films of polymerized olefins prepared in the practice of this invention contain from about 96 to about 99.96 weight percent of polymerized olefins and from about 0.04 to about 4 weight percent of a suitable block-reducing liquid. While effective amounts and preferred concentrations of the liquid vary with the viscosity of the liquid, the amount of block-reduction desired, and the smoothness of the film surface, generally preferred concentrations of liquids for the purposes of the invention range from about 0.125 to about 2 weight percent. As a rule the smooth surface films require more liquid for a given amount of block-reduction than do the rough surface films, e.g., an embossed film. For example, whereas a particular smooth surface linear LDPE film may require as much as about 2 to 4 weight percent of the liquid to give a certain block-reduction, only about 0.25–0.5 weight percent of the same liquid may be sufficient to give the same block-reduction in an embossed film.

The films according to this invention are readily prepared by (1) intimately admixing the olefin copolymer with a suitable liquid and (2) extruding the resulting mixture in the form of a clear, flexible sheet which is subsequently cooled in a draw-down procedure to form a film having an average thickness in the range of about 0.3 mil to about 2.0 mils. The thin sheet is extruded and drawn onto a chill roll. Different results are usually obtained by the well-known blown-bubble technique. The linear low density ethylene polymers may also be co-extruded with ordinary ethylene polymers so that the ordinary polymers form very thin outer, adhered layers on one or both sides of the linear low density polymers.

Mixing of the required components is readily carried out in a conventional mixing apparatus such as a Banbury mixer or screw type extruder. In one embodiment wherein the mixing device is a screw type extruder, the liquid is fed into the extruder at one or more points along the barrel of the extruder, preferably at a point about halfway along the barrel. The extruded mixture may be mixed with more virgin polymer(s) prior to final extrusion or may be fed directly into an extruder equipped with a sheet die and extruded in the form of a transparent flexible sheet. In one extrusion operation the transparent sheet is extruded onto a chill roll and is drawn down to form a film having the desired thickness, usually between about 0.3 to about 2.0 mils (1 mil=0.0254 mm.). Suitable extrusion apparatus include a typical screw type extruder, an extruder equipped with a ramming device and the like.

In a preferred embodiment the mixing and extruding steps are carried out in a single apparatus which is a typical screw type extruder that is equipped with a sheet die and a liquid inlet placed along the extruder barrel which houses the screw or screws of the extruder. The block-reducing liquid is introduced through the liquid inlet as the polymer is being extruded at a rate such that a constant mixture is maintained.

The effect on cling and block characteristics of the above polymer of various low mol. wt. hydrocarbon additives are tested by incorporating the organics into the polymer and extrusion-casting the mixture.

In the absence of any available or suitable ASTM test for measuring the cling and block properties in the present invention, the following tests were devised:

"Cling" is measured on 5 specimens of overlapped film samples as follows: 5 film samples of 1 inch by 8 inch size are cut from the film. Each of these 5 samples is cut into two equal portions of $1''\times 4''$ and the two halves are overlapped to a distance of 1", giving an overlapped area of 1 square inch. Cling is induced by pressing the 1 square inch overlap with a 10 pound weight, taking care not to contaminate the contacting surfaces of the overlapped areas, and also taking care to see that the halves are properly aligned. Ambient conditions in the test area (about 23° C. and about 50% relative humidity) closely approximate normal ASTM recommended conditions. The ends of the overlapped samples are clamped into the jaws of an Instron tensile tester. Tensile forces are applied using a 2-inch span, 5 inch per minute crosshead speed and a load range of 0 to 2 pounds. The force in grams required to overcome the cling is measured and the average of the 5 samples is recorded as the cling value. Using this test, cling values on the order of about 1.0 or more are considered as having high cling as desired in "cling films."

"Blocking" is measured according to the following procedures:

A balanced beam is provided with an empty water-reservoir dangling from one end and a 3.75" by 3.75" by 1" block (about 14 in.$^2$ face) dangling from the other end. Immediately below the said 14 in.$^2$ block is a similar 14 in.$^2$ block, the two 14 in.$^2$ flat surfaces barely touching together when no weight is applied to either end of the balanced beam. The lower block is fixed and does not move. The balanced beam rests on a blade-edge fulcrum and is very sensitive to small weights. Two film specimens, each measuring about 6" by 6" are brought together so that a complete side (face) of one specimen is totally against a complete side (face) of the other. The so-formed 2-ply specimen of 6" by 6" dimension is centered between the two 14 in.$^2$ blocks (while the beam is restrained from moving) with the two blocks touching the upper and lower surfaces of the 2-ply specimen. The protruding edges of the 2-ply specimen are separated from each other by hand, the freed edges of the upper ply being affixed in some manner (e.g., rubber band or an adhesive) to the outer edges of the upper block and the freed edges of the lower ply being affixed to the outer edges of the lower block, leaving the 14 in.$^2$ portion of the 2-ply specimen still clinging, ply-to-ply, between the blocks. When the specimen is ready for testing, the restraint on the beam is removed and water is rapidly dripped into the reservoir on the other end of the beam. For consistency from test to test, the rate of water dripping is substantially consistently at a rate such that the drips are too fast to be easily counted. When the two plys of film become parted the water addition is stopped and the weight of water in the reservoir is determined in grams. For "ordinary block," the two plys of film are merely brought together (excluding air bubles) in such a manner that not more than negligible compression is used. For "induced block" a compression force of 4.12 pounds is applied for 24 hours at ambient room conditions (23° C., 50% R.H.) by putting a 5"×5" flat steel plate (4.12 lbs.) on top of the 2-ply specimen, using Mylar plastic sheets on each side of the 2-ply specimen to avoid any unwanted blocking or clinging to the table top or to the steel plate; this compression force is about 0.1648 lbs./in.$^2$ (or about 11.6 gms./cm$^2$). After this the 2-ply sample is positioned between the blocks of the test apparatus and fastened to the blocks and tested as described above. "Induced hot block" is tested the same way as above except that the pressure of the steel plate is maintained for 24 hours at a predetermined temperature of, say, 40° C. or 60° C. in a temperature-controlled oven. Each test of block is repeated a plurality of times and the results averaged; in this specification the block values reported are the average of 4 specimens unless otherwise noted.

Induced "hot block" is an accelerated test made to simulate extended warehouse (or other) storing where ambient temperatures can reach as high as about 140° F. (60° C.) on hot days.

For purposes of description in this disclosure, the following "block" ranges are arbitrarily assigned for the relative results obtained by experience using the above-described block tests:

| Approximate Block Range | Relative Effect |
|---|---|
| up to about 50 | this is a good, acceptable range which generally gives no handling or "peel-off" problems with rolls or stacks of films. |
| about 50–150 | this is a "high block" range where one may encounter some handling problems and slower "peel-off" rates with rolls or stacks of films. |
| about 150–550 | this is an "excessive block" range wherein handling problems are very pronounced and where "peel-off" of rolls or stacks is seriously hampered; in some cases one may encounter "destructive" block, such as with very thin films which easily tear or stretch. |
| above about 550 | "destructive" blocking is most likely encountered, making handling or peel-off of stacks or rolls practically hopeless. |

When a reduction in block is made there is an accompanying improvement in handling.

The following examples are given as illustrations of the invention and are not to be construed as limiting its scope. Throughout this specification and claims, all parts and percentages are by weight unless otherwise indicated.

EXAMPLE 1

For this example there is used a linear, low density ethylene/1-octene copolymer prepared using a Ziegler-type catalyst, having copolymerized therein about 10% by wt. of 1-octene, having a melt index of 2.3 as measured by ASTM D-1238 condition (E), and having a density of 0.917 gms./cc as measured by ASTM D-792.

In the following Table I, Sample A is a control sample (no additive) of the LLDPE polymer film containing 10% 1-octene, 2.3 M.I., and 0.917 gms./cc density and having a thickness of about 0.9 mil.

Sample B-1 is same as Sample A, but with 750 ppm. polyethylene glycol P-3000 (mol. wt. 3000) added.

Sample B-2 is same as Sample A, but with 1500 ppm. of P-3000 added.

Sample B-3 is same as Sample A, but with 3000 ppm. of P-3000 added.

Sample C-1 is same as Sample A, but with 750 ppm. polyethylene glycol P-2000 (mol. wt. 2000) added.

Sample C-2 is same as Sample A, but with 1500 ppm. P-2000 added.

Sample C-3 is same as Sample A, but with 3000 ppm. P-2000 added.

Sample D-1 is same as Sample A, but with 3000 ppm. glycerine added.

Sample D-2 is same as Sample A, but with 3000 ppm. glycerol monostearate added.

TABLE I

| Sample | Additive | Induced Block, gms | Induced Hot Block, 140° F., gms. |
|---|---|---|---|
| A | (control) | 148 | 609 |
| B-1 | 750 ppm. P-3000 | 144 | 378 |
| B-2 | 1500 ppm. P-3000 | 135 | 342 |
| B-3 | 3000 ppm. P-3000 | 131 | 270 |
| C-1 | 750 ppm. P-2000 | 133 | 544 |
| C-2 | 1500 ppm. P-2000 | 109 | 298 |
| C-3 | 3000 ppm. P-2000 | 108 | 280 |
| D-1 | 3000 ppm. glycerine | 143 | 521 |
| D-2 | 3000 ppm. G.M. | 121 | 552 |

The "hot block" for Samples C-1, D-1, and D-2 are almost still in the "destructive block" range, but are nevertheless an improvement over Sample A which is destructively blocked.

The cling test per se was not employed on the Samples in Table I but all were recognized as having good cling properties based on educated "feel" and on the relatively high induced block values.

The results with glycerine and glycerol monostearate in Table I indicate that the cling and block properties are not of a static electricity nature, since they are known to be effective in substantially neutralizing static electricity in plastic films.

EXAMPLE 2

For this series of tests there is used the linear LDPE (0.917 gms./cc density; 2.3 M.I.) of Example 1 and an ordinary high pressure process LDPE (0.919 gms./cc density; 5 M.I.). Using the linear polymer as a central layer and the LDPE as thin skin layers on each side of the central layer, cast co-extruded films are prepared wherein the central layer is about 0.7 mil thick, each outer skin layer is about 0.1 mil thick, giving a 3-ply well-adhered laminar film having a thickness of about 0.9 mil. 5000 ppm. of polyethylene glycol P-2000 are incorporated into some of the polymer samples before they are cast co-extruded into the 3-ply films. The cast films are about 3 feet wide and multiple test samples are taken from near the left side, the center, and the right side of each film.

In Table II, Film A contains no P-2000 in the central layer or in the skin layers; Film B contains P-2000 only in the skin layers; Film C contains P-2000 only in the central linear polymer layer; Film D contains P-2000 in both the central layer and the skin layers. The "target" for P-2000 loading of the Film B skins is about 1000 ppm., for the central layer of Film C is about 3000 ppm., and for the central layer and skins of Film D is about 6000 ppm.

In Table II the values shown for block and cling are averages of 4 samples and 5 samples, respectively. Then, in order to make comparisons between Films A, B, C, and D easier, the averages of all the data groups are averaged in Table II. The relatively wide range of values in some of the data groups is not fully understood, but the averaged data is believed to be quite suitable for making comparisons and to study the effect of the P-2000 additive.

TABLE II

| FILM | P-2000 ppm | Induced Block (23° C.) | Induced Hot Block (60° C.) | Cling |
|---|---|---|---|---|
| A-Left | 0 | 80.7 | 240 | 1.24 |
| A-Center | 0 | 108 | 300 | 1.26 |
| A-Right | 0 | 62.6 | 219 | 1.42 |
| A-(Ave.) | (0) | (83.8) | (253) | (1.31) |
| B-Left | 1274 | 52.1 | 83.8 | 1.41 |
| B-Center | 1328 | 35.6 | 128.5 | 1.32 |
| B-Right | 806 | 61.3 | 223 | 1.18 |
| B-(Ave.) | (1136) | (49.7) | (145.1) | (1.30) |
| C-Left | 2960 | 38.1 | 101.2 | 1.15 |
| C-Center | 3180 | 38.5 | 68.7 | 0.98 |
| C-Right | 3200 | 37.2 | 64.1 | 1.15 |
| C-(Ave.) | (3113) | (37.9) | (78) | (1.09) |
| D-Left | 5830 | 38.0 | 65.7 | 1.15 |
| D-Center | 6100 | 46.0 | 93.3 | 1.17 |
| D-Right | 5690 | 34.0 | 69.5 | 1.10 |
| D-(Ave.) | (5873) | (39.3) | (76.2) | (1.14) |

EXAMPLE 3

(Comparative Test)

For comparison with the 3-ply films of Example 2, tests are made on 0.9 mil films of ordinary high pressure LDPE having a melt index of 5.0 and density of 0.919 gm./cc. The results are as follows:

TABLE III

| | LDPE With No Additive | LDPE Plus 1000 ppm P-2000 | LDPE Plus 3000 ppm P-2000 | LDPE Plus 6000 ppm P-2000 |
|---|---|---|---|---|
| Induced Block @ Room Temp. | 67.9 | 71.9 | 44.6 | 32.3 |
| Induced Block @ 140° F. | 265 | 147 | 96 | 56.9 |

The purview of the present invention is not limited to the particular embodiments of the invention described herein, other embodiments becoming apparent to persons skilled in the art upon their reading this disclosure. The invention is limited only by the following claims.

We claim:

1. A composition comprising a linear, low density ethylene copolymer having incorporated therein an amount in the range of about 0.04 to about 4 weight percent of at least one block-reducing agent comprising a liquid organic having a molecular weight in the range of about 300 to about 5000, a Saybolt viscosity of at least 100 centistokes at 25° C., and a boiling point above about 285° C.

2. An extrusion-cast film of the composition of claim 1.

3. The composition of claim 1 wherein the linear, low density ethylene copolymer comprises ethylene copolymerized with a sufficient amount of at least one alpha, beta-ethylenically unsaturated alkene of from 3 to 12 carbon atoms to provide a copolymer having a density in the range of about 0.90 to about 0.93 gms./cc, and having a melt index in the range of about 0.2 to about 20 gms./10 min. as measured by ASTM-D-1238(E).

4. The composition of claim 3 wherein the alkene is at least one selected from the group consisting of propylene, butene, isobutene, pentene, isopentene, hexene, isohexene, heptene, isoheptene, octene, isooctene, nonene, isononene, decene, and isodecene.

5. The composition of claim 3 wherein the alkene is octene.

6. The composition of claim 1 wherein the liquid organic has a molecular weight in the range of about 300 to about 3000.

7. The composition of claim 1 wherein the liquid organic is at least one selected from the group consisting of polyalkylene ether polyols, polyepichlorohydrin, polyhydric alcohols, liquid esters of high molecular weight fatty acids, vegetable oils, and polyethers.

8. The composition of claim 1 wherein the liquid organic is at least one selected from the group consisting of polyalkylene glycol, polyhydric alcohols, liquid esters of fatty acids, and polyoxyethylene ethers.

9. The composition of claim 1 wherein the liquid organic is at least one selected from the group consisting of polyethylene glycol, glycerine, and glycerol monostearate.

10. The composition of claim 1 wherein the liquid organic comprises polyethylene glycol having a molecular weight in the range of about 2000 to about 3000.

* * * * *

UNITED STATES PATENT AND TRADEMARK OFFICE
CERTIFICATE OF CORRECTION

PATENT NO. : 4,415,691

DATED : November 15, 1983

INVENTOR(S) : James A. Allen, George W. Knight, Morris S. Edmondson

It is certified that error appears in the above—identified patent and that said Letters Patent is hereby corrected as shown below:

Col. 1, line 51, "in the same" should be deleted and the following inserted -- to cause the --.

Col. 1, line 56, "retain" (second occurrence) should be deleted.

Col. 2, line 42, "charactistics." should read -- characteristics. --.

Col. 4, line 61, "have" should read -- having --.

Col. 6, line 68, "bubles)" should read -- bubbles) --.

Signed and Sealed this

First Day of May 1984

[SEAL]

Attest:

GERALD J. MOSSINGHOFF

Attesting Officer    Commissioner of Patents and Trademarks